INVENTOR
DAVID CHARLES
    MAINDONALD
By Young & Thompson
        ATTYS.

United States Patent Office 3,336,858
Patented Aug. 22, 1967

3,336,858
TOASTERS FOR SLICED BREAD AND THE LIKE
David Charles Maindonald, 4 Bannerman Road,
Western Springs, Auckland, New Zealand
Filed Oct. 4, 1965, Ser. No. 492,479
6 Claims. (Cl. 99—391)

ABSTRACT OF THE DISCLOSURE

A bread toaster has upright toasting compartments with trap door bottoms. When the bottoms open, the toasted bread falls into a rack having bread-receiving compartments whose sides diverge upwardly. The rack may be pulled forward to remove the toast.

---

This invention relates to improvements in toasters particularly for sliced bread for which use the invention will be hereinafter described, though it is to be appreciated that it may be used for toasting other foodstuffs of a somewhat similar character or shape.

The invention has particular application to a toaster for use in cafeterias, hotels, institutions, commercial kitchens and other eating houses though it may be used in smaller capacity sizes in homes.

The object of the invention is to provide a neat unit to enable sliced bread to be inserted into a toaster so constructed, and with heating elements so controlled, that after a pre-set time sufficient for the toasting of the bread to the desired degree the toast automatically falls downwardly into a holding receptacle in the unit and power to the heating elements will be switched off. This will enable a fresh loading of the toaster to be made before the finished batch of toast is removed from the bottom of the unit.

In one aspect the invention consists broadly of a toaster for the purpose described having a frame or casing enclosing heating elements adapted to be coupled to a heat supply source and an entry or entries in the casing to the space between the elements to allow for the insertion of sliced bread or the like characterised in that the bread or the like is held supported in a toasting position between the elements on a platform or the like, which is adapted to be swung or tilted manually or time controlled to drop the toast downwardly into a space below and clear of the said elements.

In a second aspect the invention consists of a toaster for the purpose described having a frame supporting or casing enclosing three main sections, an upper bread toasting compartment containing the electric toasting elements with an opening or openings for the insertion of a slice or slices of cut bread or the like to the space or spaces adjacent to the elements, a lower toast catching and holding receptacle or compartment for receiving and holding the finished toasted bread and a controls compartment housing equipment necessary for switching on electric power to the elements with a pre-set time period cut off and releasing the toasted slice or slices at the end of that period so that it falls or they fall from the element area down into the finished toast holding receptacle or compartment.

In more fully describing the invention in a preferred form reference will be made to the accompanying drawings in which.

The toaster comprises a unit enclosed in a casing A, as for instance of sheet metal, which may be faced wholly or in part with insulating material.

Within the upper section there is mounted the toast heating means B. Suitably, for commercial purposes, the means comprise four rows of elements C, each coupled to an electric power lead C1, so that there are three intervening channels D so spaced as to be able to receive three rows of cut bread in racks with suitable clearance.

One convenient size enables three pieces of bread to be inserted end to end in each of the three channels. The outer rows of elements are single sided while the inner are double sided.

There is a long slot in the top of the casing directly above each of the three channels. Located in each of these three channels is a bread holding rack in guard of a double line of spaced fingers E made of metal wire or punched sheet metal which extend upwardly each parallel with and close to an element. Each pair of lines of fingers of the rack or guard are set apart a distance somewhat wider than the sliced bread to be dropped vertically down into it.

Figure 1:
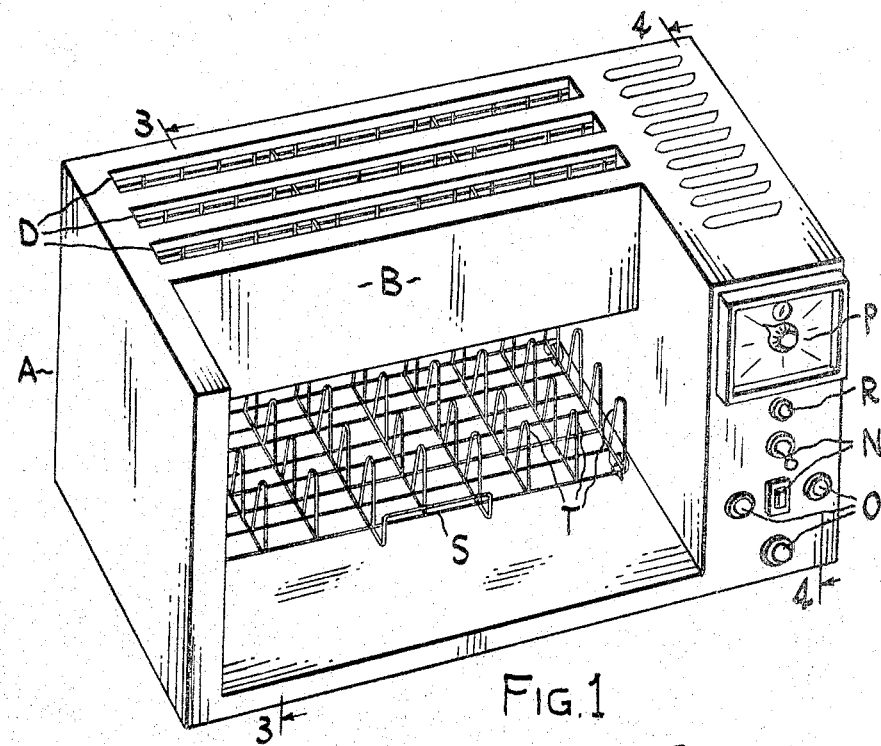
FIGURE 1 illustrates in perspective the front and top view of the toaster.
Figure 2:
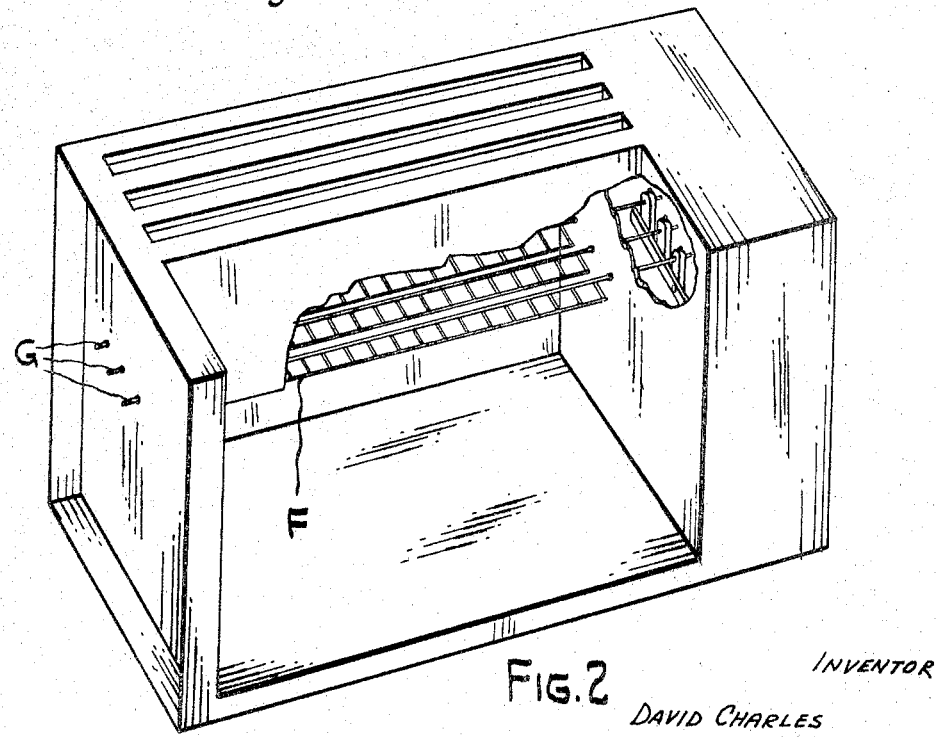
FIGURE 2 illustrates in perspective the front and top view of the toaster with portions of the casing removed and broken away to illustrate the interior working of the toast supporting platforms.
Figure 3:
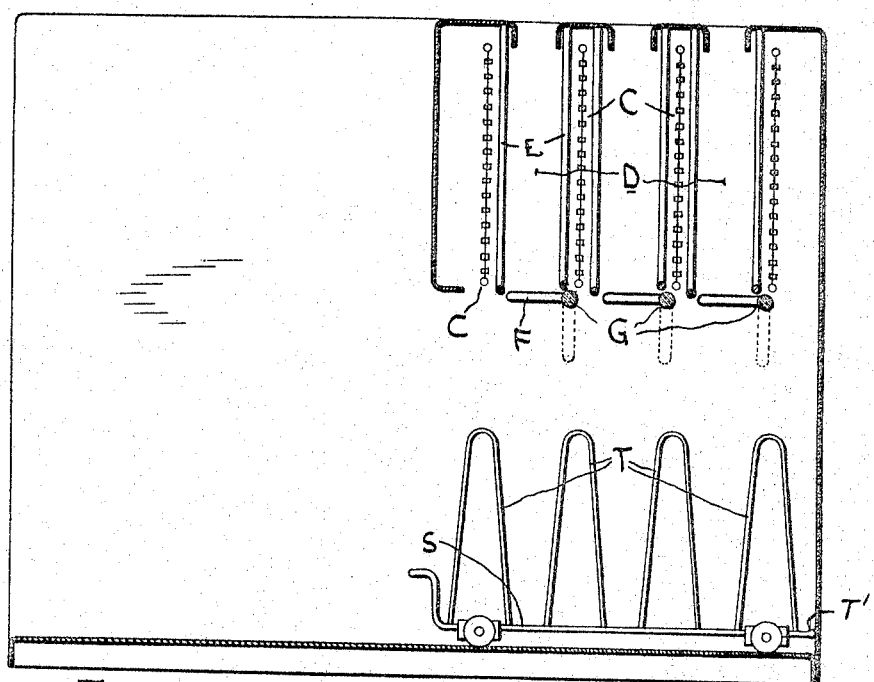
FIGURE 3 illustrates a sectional side elevation on the line 3—3 of FIGURE 1
Figure 4:
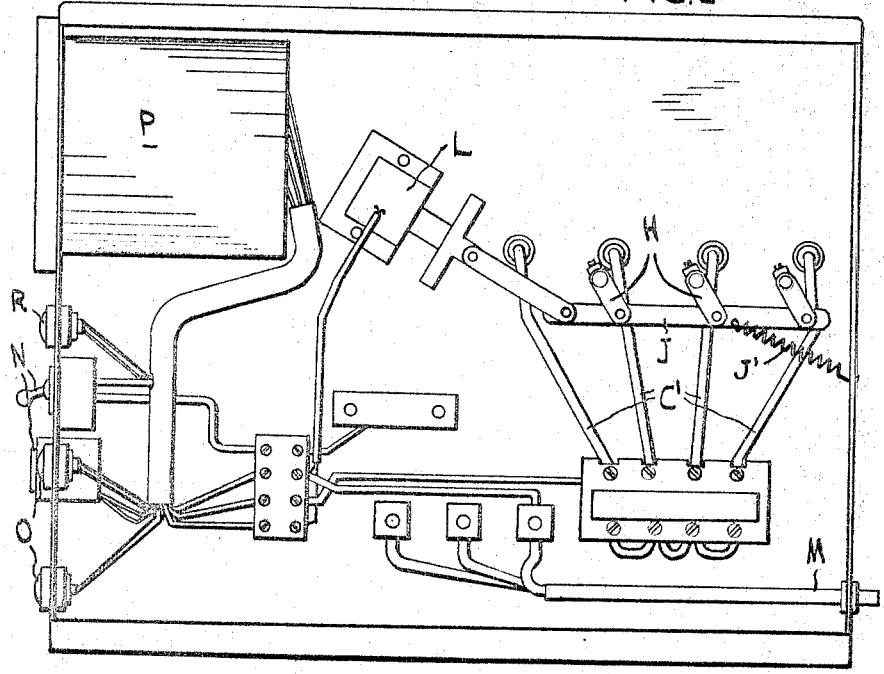
FIGURE 4 is a sectional side elevation on the line 4—4 of FIGURE 1.

The top of the three racks or guard openings is open but the bottom of each has a hinged holding platform F so that sliced bread dropped through the slot in the casing down into each longitudinal rack opening may be caught and held in the desired position for the toasting operation by these platforms when they are positioned horizontally as shown in full lines in FIGURE 3 of the drawing. Each platform is mounted along one side on a rod G the ends of which are journalled in the sides of the casing so that as the rod is turned the platform may be moved to lie horizontal to close and form the bottom of the rack while when left free the platform will swing by its own weight as a gate to open up the bottom of the rack as is illustrated in dotted lines in FIGURE 3 of the drawing.

To turn these rods they are coupled by short lever arms H to a bar J which is in turn coupled through a link to a solenoid L such that when energised the latter will serve through the levers to cause all the platforms F to swing to close the bottom of the racks. The action of the platform becomes more positive when assisted by the weight of the solenoid core and a tension spring J'.

The toaster is designed to be connected by a lead M to an electric power source and on the face of the casings are switches N, lights O and time control mechanism P for indicating that the power is on to the toaster, and that it has been switched on to the elements for a pre-determined time. An additional light R indicates toasting completed. The solenoid control is connected to the time control.

In the bottom reception area there is located on a base toast holding rack S, capable of being slid laterally into and out of the casing, and on rollers comprising three pairs of rows of upstanding wire or metal strip fingers T so corresponding with the toasting rack in the top section of the unit that the rows can be positioned directly below those in the toasting rack a distance clear therefrom. At the lower forward end of the rack S there is provided a stop means T' which is adapted to engage a casing wall and properly position the rack S beneath the bread toasting compartments. The bottom of the rows are closed but the tops of each pair of lines of the fingers diverge to make a wider mouth than the space between the double line of spaced fingers of metal wire or punched sheet metal aforementioned.

In operation the desired sequence is visually indicated to the user by the lights on the toaster casing, the user (1) sets the timer (2) turns on control switch which through the solenoid coupled thereto closes the platforms at the bottoms of the rows of the toasting racks. (3) Sliced bread is then inserted down into the toasting racks and (4) a push button is pressed to cause power to be supplied through a relay to the elements of the toaster and at the same time the timer commences to run for the pre-determined period calculated as being enough to toast the sliced bread to the desired degree.

As soon as the period has expired the timer causes the power to be cut off to the elements and also to the solenoid and the latter operates to allow the platforms forming the bottom of the toasting racks to swing down and the hot toast drops through from the top section down ino the waiting holding racks or reception area in the bottom section of the toaster from which it may be removed as required.

The sequence lights make it apparent to the user whether the toaster is in operation when the operation is completed and a pilot light indicates when electric power is switched on to the toaster.

Naturally other sequences may be wired into the toaster and the casing may be of shapes other than that mentioned. While the toaster described has a capacity for nine pieces of bread the number of rows and length thereof may vary to allow for the simultaneous toasting of less or more pieces of toast.

What is claimed is:

1. A bread toaster comprising a casing, means in the casing defining a plurality of upright toasting compartments, heating elements for toasting both sides of the slices of bread in said compartments, elongated openings through the top of the casing for inserting sliced bread into the compartments, bottom members for closing the bottoms of the compartments and for supporting slices of bread on edge during toasting, means mounting said bottom members for vertical swinging movement about spaced parallel horizontal axes, means for swinging said bottom members downwardly when the bread is toasted to permit the slices of toast to fall by gravity from said compartments, rack means for catching said falling slices of toast, said rack means comprising means defining a plurality of upwardly open elongated slots one disposed beneath each toasting compartment and parallel to said elongated openings and adapted to retain slices of toast on edge, and means mounting said rack means in said casing for horizontal reciprocatory movement from a rearmost position in which one said slot is disposed beneath each toasting compartment to a forward position in which toast in said slots is accessible for manual removal.

2. A bread toaster as claimed in claim 1, said means defining said slots comprising a plurality of fingers that are wider at their base than at their tops in a direction perpendicular to the plane of the slices of toast so that said slots are substantially narrower at their bottoms than at their tops.

3. A bread toaster as claimed in claim 1, said means defining said slots comprising a plurality of upwardly extending fingers that are spaced apart in a horizontal direction parallel to the length of said elongated openings.

4. A bread toaster as claimed in claim 3, said fingers being comprised each by a metal strip of inverted generally U-shaped configuration.

5. A bread toaster as claimed in claim 1, and means for swinging said bottom members simultaneously vertically between open and closed positions, said swinging means comprising horizontal rods on each of which a said bottom member is mounted and which in turn is rotatably mounted in said casing, a short lever arm fixed to each horizontal rod, said short lever arms being parallel to each other, a bar to which all of said short lever arms are pivotally secured, and a solenoid for reciprocating said bar so that all of said bottom members turn simultaneously in the same direction and remain parallel to each other in all of their vertically swung positions.

6. A bread toaster as claimed in claim 1, and stop means on said rack means that contacts said casing positively to locate said rack means in said rearmost position.

References Cited

UNITED STATES PATENTS

| 1,841,301 | 1/1932 | Schroeder et al. | 99—391 X |
|---|---|---|---|
| 2,414,139 | 1/1947 | Cherry | 99—334 |
| 2,465,577 | 3/1949 | Cox | 99—389 X |
| 2,478,253 | 8/1949 | Doner | 99—385 X |
| 2,644,392 | 7/1953 | Foster | 99—391 X |
| 3,229,613 | 1/1966 | Matzenauer | 99—327 X |
| 3,229,614 | 1/1966 | Matzenauer | 99—327 |

BILLY J. WILHITE, *Primary Examiner.*